United States Patent [19]

Schleimer et al.

[11] 4,349,382
[45] Sep. 14, 1982

[54] PROCESS FOR REFINING OF A BATH OF METAL CONTAINING COLD SOLID SUBSTANCES

[75] Inventors: Francois Schleimer, Dudelange; Romain Henrion, Esch; Ferdinand Goedert, Dudelange; Lucien Lorang, Differdange, all of Luxembourg

[73] Assignee: Arbed S.A., Luxembourg, Luxembourg

[21] Appl. No.: 144,228

[22] Filed: Apr. 28, 1980

[30] Foreign Application Priority Data

Apr. 30, 1979 [LU] Luxembourg .............................. 81207

[51] Int. Cl.³ .......................... C21C 5/32; C21C 5/34
[52] U.S. Cl. ........................................... 75/60; 75/59
[58] Field of Search .................................. 75/60, 59

[56] References Cited
U.S. PATENT DOCUMENTS 3,854,932 12/1974 Bishop ..................................... 75/60
3,960,546 6/1976 Rote ........................................ 75/59
3,970,446 7/1976 Kolb ....................................... 75/59
3,997,335 12/1976 Kalb ....................................... 75/60
4,089,677 5/1978 Spenceley .............................. 75/59
4,210,442 1/1980 Lewis ..................................... 75/60

Primary Examiner—P. D. Rosenberg
Attorney, Agent, or Firm—Michael J. Striker

[57] ABSTRACT

A process for refining a metal bath in a converter by oxygen blowing, particularly a molten metal liquid bath containing cold, solid substances, notably of scrap. Oxygen is distributed over the surface of the bath, so that there will be an after-combustion of CO released in the course of decarbonization. The thickness and consistency of a slag layer formed over the bath is actively regulated by injecting a rising inert gas through the bottom of the bath. The flow of rising gas may be regulated depending upon the oxygen content in the fumes of the converter, or upon the intensity of emission through the top of an oxygen blowing lance.

11 Claims, 1 Drawing Figure

PROCESS FOR REFINING OF A BATH OF METAL CONTAINING COLD SOLID SUBSTANCES

BACKGROUND OF THE INVENTION

The present invention concerns a process for refining a metal bath by oxygen blowing, particularly a molten-metal liquid bath containing a relatively high percentage of cold solid substances, notably of scrap.

The processes for refining of the melt by oxygen blowing permit, as is known, the incorporation of a greater or smaller amount of scrap or possibly of ore. The importance of this addition of cooled substances is dependent on the essential production of a quantity of thermal energy available in order to assure their melting.

In the processes for refining by means of oxygen blowing the thermal energy evolved derives in part from the exothermic reactions resulting from the oxidation of oxidizable elements contained in the melt, so that the incorporated amount of solid substances is a function of the content of C, Si, P, Mn charged in the melt.

Moreover, the release, in the course of the decarbonization of the melt, of CO which can occur according to the conditions developed in the converter, more or less favors a combustion. This after-combustion exothermic reaction constitutes a supplemental source of energy which one can seek to utilize to increase the rate of consumption of the scrap incorporated in the load.

The efforts with an eye to better exploitation of the energy sources present in the charged load, rather than to have recourse to outside energy, the costly contribution of which reduces the savings realizable through the augmentation of added scrap, have given birth to variants in the technology of oxygen blowing.

Thus it is, for example, known to augment the rate of combustion of CO above the molten bath in the course of the oxygen blowing process by increasing the quantity of oxygen available in the immediate proximity of the surface of the bath and outside the central blowing zone to a high level. One can obtain this increase thanks to supplemental oxygen blowing, subdivided in a plurality of jets covering a zone appreciably annular, which permanently cover the largest possible part of the surface of the bath. For the execution of this technique it is necessary to dispose special nozzles outside the primary nozzles and occasionally several secondary nozzles are present auxiliary at specific angles of inclination, adapted to the dimensions and shape of the converter.

Notwithstanding the use of special costly lances to increase the rate of after-combustion of CO near the surface of the bath, all imaginable efforts to increase the temperature near the surface of the bath for the purpose of melting an excess of scrap, are opposed by the presence at the surface of the bath of a layer of thick and foaming slag which forms on top of the bath in the course of refining by oxygen blowing and which acts like a thermal insulator thanks to its foaming consistency.

The purpose of this invention therefore is to propose a refining procedure permitting an increase in the traditional time for adding solid scraps while wholly avoiding the described disadvantages.

SUMMARY OF THE INVENTION

This purpose is obtained by the following process of the invention which makes provision for refining at the top of the melt by oxygen blowing and is characterized in that in part an after-combustion of CO released in the course of the decarbonization is induced in the immediate proximity of the surface of the bath, from distribution of the oxygen over the total of the aforesaid surface. Further, in order that the thickness and consistency of the active slag at the disequilibrium between this and the metal bath be maintained during at least the largest part of the duration of the refining an essentially inert gas is injected through the bottom of the bath.

The idea which is the basis of the present invention consists in the proposal of a refining process in the course of which the interface between the metal and the slag is swept out by a rising inert gas, so that the slag is permanently deoxidized and cannot therefore thicken to foamy consistency. This sweeping away is preferably carried out during the whole period of refining, permitting the advantages of the refining process at the bottom of a furnace as the reactions between metal and slag proceed by slow diffusion to be combined with the advantages of the known per se LD and LDAC processes, which are distinguished by the speed of the reactions.

One of the characteristic traits of the processes for the refining of the melt by oxygen blowing at the top, such as the LD and LDAC processes, consists in the fact that one creates, following the development of blowing, on top of the bath a slag which is foamy and highly oxygenated. One can to a certain extent regulate the distribution of the oxygen for the blowing between the slag and the metal by measuring the distance between the head of the lance and the level of the bath, for a constant demand of oxygen and for a head of a lance of a given shape. This way a raised portion of the head of the lance results in a preferential oxidation of the slag which takes a foamy consistency, which favors phosphoryzation and desulphurization, whereas a slight elevation of the head of the lance is accompanied by an accelerated de-carbonization and by enhanced release of heat, particularly at the point of impact of the oxygen jet.

Although in general one seeks the formation of a foamy, oxygenated slag because of the beneficial effects described, there exist disadvantages which are related to the foamy and oxygenated slag, one of them being that a foamy slag can hinder the passage toward the bath and the scrap there contained of the thermal energy released by the after-combustion of CO.

According to the invention the state of foaminess is controlled by the introduction of a rising gas through the bottom of the path. The gas is a gas or a mixture of gases the major part of which is inert.

By inert it is meant that any of the gas used does not react appreciably with the predominant constituents of the bath under the conditions of insufflation according to the invention. In general, nitrogen is used, which is available at advantageous price in the case of manufacture of oxygen for blowing by fractional distillation of air.

According to the invention the gas is injected to rise through the bricks lodged in the lining at the bottom of the converter and which are disposed radially apart from the vertical axis of the point of impact of the oxygen that is directed from the top over the surface of the bath.

Thus is attained through the aid of a limited number of points of introduction, subjection of the action of injected gas completely in the bath and wholly at the metal-slag interface. The insufflation of rising gas is supervised so that the consistency of the slag stays uniform and free of foam and so that the decarbonization of the melt can develop in a more balanced manner and more homogeneously through the bath. Indeed, with the metal-slag interface being constantly regenerated by the passing of rising gas, the physical-chemical disequilibrium between the metal and the slag is reduced in a manner so rapid, uniform and verifiable, that it also results in a reduction of the refining time.

The distribution of oxygen for blowing from the top over the surface of the bath with the help of lances, which can be ordinary lances, and the disposition of foraminous distributor bricks according to the invention, allows also the advantage of preventing an intolerable nitrification of metal in the course of the refining. A very marked nitrification can be observed in the case where the nitrogen is injected in the region of impact of the oxygen blast at the top, that is to say, in the regions where extreme heat prevails.

According to the invention, the intensity of injection of the rising gas is regulated according to the results obtained by a measure indicating the consistency of the slag layer, that is to say, by its degree of foam and by the level which covers the bath; the flow of gases is increased in the case of increases in the thickness and the degree of foam in the slag, and the flow of gas is decreased in the opposite case.

A measure indicative of the thickness of the layer of slag and its degree of foaming results, according to a first embodiment, through surveillance of the degree and of the speed of deoxidation of the slag which is determined according to the content of oxygen in the fumes of the converter, for example, with the help of a mass spectrometer.

According to another embodiment, the indicative measure of the thickness of the layer of slag and of its degree of foaming can be based upon the measure of the intensity of sound generated by the oxygen blowing lance.

It has been found that thanks to the rising gas utilized in the course of the refining, the adjustment operations for the top of the lance which are normally indispensable for regulation of the preferential character of the reactions in the bath, are no longer necessary and the role of the lance is confined to that of a simple supplier of oxygen in the case of an LD process and of oxygen and lime in the case of an LDAC process. This makes the invention of practical and economic importance, given that it is no longer necessary that the lances be nearly constantly in motion and that the shapes of the heads of the lances be so complex.

According to the invention, one chooses the top of the lance to correspond to a position which normally leads to the formation of a foamy slag and strong oxidation.

One starts then the refining in a conventional manner until the formation of a layer of slag thick enough, determined in an empirical manner, for example by looking at a sonorimeter, after which the injection of rising gas is started and the flow of such rising gas is regulated in a manner to maintain the slag in a constant state with proper consistency and fluidity.

The novel features which are considered as characteristic for the invention are set forth in particular in the appended claims. The invention itself, however, both as to its construction and method of operation, together with additional objects and advantages thereof, would be best understood from the following description of specific embodiments when read in connection with the accompanying drawing.

BRIEF DESCRIPTION OF THE DRAWING

The graph in the sole FIGURE, representing the curve of the intensity of the rising gas at the time of refining of an LDAC charge according to the invention, serves to illustrate the possibilities for regulation of the thickness and of the consistency of the slag, by modifying the flow of rising gas.

DESCRIPTION OF THE PREFERRED EMBODIMENTS

Figure 1:
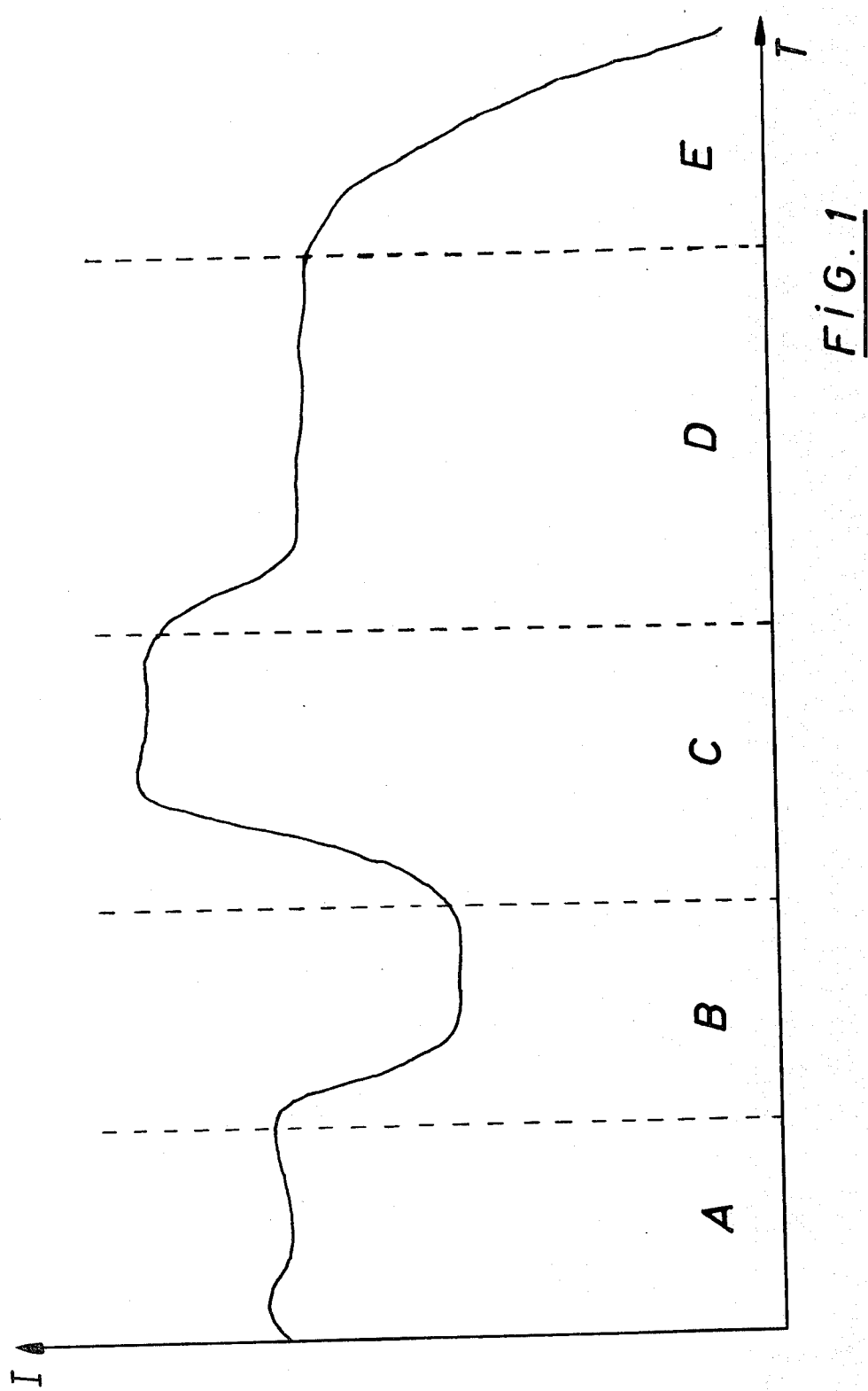

A converter with a capacity of 150 tons of steel contained 100 tons of melted liquid phosphorus and 68 tons of solid scrap. It was equipped with a conventional blowing lance at the top; in its bottom were lodged 12 foraminous distributor bricks disposed radially apart from the vertical axis of the point of impact of the oxygen jet. The rising gas was nitrogen.

Whereas the consumption of scrap per ton of melt realizable according to classical procedures is about 300 kg for the refining of melt poor in phosphorous and about 400 kg for the refining of phosphorous melt it was possible to include 680 kg of scrap per ton of melt when operating according to the invention.

As shown in the FIGURE, during the time T of refining the sound intensity I of the oxygen blowing lance was measured. During period A the flow of rising nitrogen through the bottom of the converter was 600 $Nm^3$/hour. A decrease in the flow to 400 $Nm^3$/hour in period B was experienced through a substantial decrease in its sound intensity, indicating an increase in the thickness and in the foaming of the slag. One reacts against this phenomenon, as illustrated in C, by increasing the flow of rising gas to 750 $Nm^3$/hour, which has the effect of increasing the sound intensity to a higher value than that measured in period A where the flow was 600 $Nm^3$/hour. In period D the flow was adjusted again to 600 $Nm^3$/hour and it is observed that the sound intensity there approaches that of period A and remains stationary until final period E where the flow of rising gas is cut which decreases the value of the sound intensity there to a minimum.

These results demonstrate the feasibility of the method of measuring the sound intensity in relation to the thickness and the consistency of the slag, as well as the adjustability of these with the parameter of flow of rising gas.

The fact that a quantity of 680 kilograms of scrap per ton of melt can be added to the bath and the added scrap melts quickly and without problems is due to the fact that, following the refining process according to the invention, the slag is maintained in a non-foaming liquid state, allowing the thermal energy issuing from the after-combustion of CO to spread in the bath.

Without further analysis, the foregoing will so fully reveal the gist of the present invention that others can, by applying common knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claim:

1. A process for refining iron melts by blowing oxygen on top of a melted bath in a converter containing cooling matter and by distributing sufficient amounts of oxygen over the bath surface, which process comprises promoting postcombustion of CO above the bath level by actively regulating the thickness and consistency of the slag formed over the disequilibrium level between said slag and the bath by injecting an unreactive gas into the melt through the bottom of the bath, so as to prevent the formation of a thick layer of slag with a foamy consistency.

2. Process according to claim 1, wherein the gas is nitrogen.

3. Process according to claim 1, wherein the gas is a mixture of inert gases.

4. Process according to claim 1, further comprising injection of the gas through foraminous distributor bricks lodged in a lining at the bottom of the convertor and radially disposed apart from a vertical axis of a point of impact of the oxygen directed from the top over the surface of the bath.

5. Process according to claim 1, further comprising regulating the intensity of injection of gas according to a response obtained by a measure indicating the consistency of the slag covering the metal bath by increasing flow of the rising gas in case of the increased thickness and degree of foaming of the slag and by decreasing flow in the opposite case.

6. Process according to claim 5, wherein the measure indicating the thickness and degree of foaming of the slag is based upon degree and speed of deoxidation of the slag, which is determined according to content of oxygen in fumes of the convertor.

7. Process according to claim 6, wherein said content of oxygen is determined with the aid of a mass spectrometer.

8. Process according to claim 5, wherein the measure indicating the thickness and degree of foaming of the slag is based upon a determination of the sound intensity emitted by the oxygen blowing lance.

9. Process according to claim 1, further comprising refining the iron melt in at least one phase by maintaining the head of the oxygen lance at a constant level above the bath.

10. Process according to claim 9, wherein the distance of the head of the lance above the bath corresponds to a position which normally leads to formation of a slag foaming and strongly oxidized.

11. Process according to claim 1, wherein the refining is started in a conventional manner until formation of a layer of slag sufficiently thick, after which the injection of rising gas is started, and wherein flow of gases is regulated in a manner to maintain the values of thickness and consistency of the layer of slag.

* * * * *